United States Patent

[11] 3,573,484

[72] Inventor Robert W. Engroff
St. Charles, Ill.
[21] Appl. No. 750,506
[22] Filed Aug. 6, 1968
[45] Patented Apr. 6, 1971
[73] Assignee Bell Telephone Laboratories, Incorporated
Murray Hill, Berkeley Heights, N.J.

[54] PULSE CIRCUIT
12 Claims, 3 Drawing Figs.

[52] U.S. Cl. .......... 307/252, 307/246
[51] Int. Cl. .......... H03k 17/00
[50] Field of Search .......... 307/252, 252 (D), 246, 238, 305, 259; 328/67; 315/340, 241

[56] References Cited
UNITED STATES PATENTS

| | | | |
|---|---|---|---|
| 3,146,356 | 8/1964 | Kidwell et al. .......... | 307/252 |
| 3,394,284 | 7/1968 | Hurkamp et al. .......... | 328/67X |
| 3,373,298 | 3/1968 | Thompkins et al. .......... | 307/259X |
| 3,435,256 | 3/1969 | Young .......... | 307/252 |

*Primary Examiner*—Donald D. Forrer
*Assistant Examiner*—B. P. Davis
*Attorneys*—R. J. Guenther and James Warren Falk

ABSTRACT: A pulse circuit includes a pair of controlled switches connected in series with a voltage source. The gates of the switches are coupled through a network to a pulse source. The network operates to disable one gate while the other gate is enabled by a pulse from the pulse source so that the concurrent closing of both switches is prevented.

2 Sheets-Sheet 1

INVENTOR
R. W. ENGROFF
BY J S Cubert
ATTORNEY

Patented April 6, 1971 3,573,484

2 Sheets-Sheet 2

PULSE CIRCUIT

BACKGROUND OF THE INVENTION

My invention is related to switching systems and more particularly to pulse circuits useful in switching arrangements.

Switching systems such as used in modern telephone systems and data-processing equipment often employ arrays of selectable switching elements to perform control and indicating functions. These switching elements may be selectively operated by combinations of path selecting devices and electronic pulse circuitry. In telephone arrangements, the path selecting devices may be relays which provide connections to one or more switching elements in an array. Pulses from electronic circuitry can then be applied to the selected switching elements to alter their states.

The ferreed is a magnetically latched, pulse-operated device which is particularly adaptable for use as a switching element in telephone systems. It includes a closed magnetic path shunted by a pair of magnetizable contacts. At least one section of the path consists of a remanent square loop material around which a solenoid is wound. Short duration current pulses through the solenoid operate to alter the magnetic state of the path to control the operation of the contacts. Current pulses of one polarity through the solenoid operate to cause flux to flow through the contacts to close them, and current pulses of the opposite polarity through the solenoid operate to remove the flux through the contacts so that they are released. After the contacts are operated, they remain in position until the opposite polarity current pulse causes a change in state in the remanent square loop material.

The current pulses for an array of ferreeds may be produced by circuitry employing controlled switches such as silicon-controlled rectifiers. Silicon-controlled rectifiers are particularly useful in such applications because they can provide high level current pulses in response to low power level input signals. These current pulses can then be directed to particular ferreeds via switches or relay contacts.

One form of silicon-controlled rectifier circuit known in the art uses a series connected pair of rectifiers, each rectifier being operative at a different time. One rectifier produces positive current pulses at a common terminal to affect switching elements connected thereto in one way and the other rectifier produces negative current pulses to affect switching elements in the same array another way. In such series connected arrangements, however, the voltage transition caused by the turn-on of one rectifier may be effective to turn on the other series connected rectifier so that a short circuit exists through the rectifier pair. This short causes circuit malfunction and also may destroy or permanently alter the characteristics of the short circuited, high conductance rectifiers. It is known that slow-speed rectifiers in such applications are relatively insensitive to the hereinbefore described voltage transitions, but such slow-speed rectifiers require high power input signals to control rectifier operation and result in slower circuit operation.

BRIEF SUMMARY OF THE INVENTION

My invention is a pulse circuit which includes a plurality of controlled switches connected in series in like polarity across a voltage source. The gate electrode of each controlled switch is coupled to a common pulse source through a network which transmits a switch-disabling pulse to all but one of the gate electrodes and a delayed switch-enabling pulse to the one gate electrode in response to each transition of a pulse from the pulse source. The switch-disabling pulse blocks the turn-on of the all but one controlled switch so that these switches are unaffected by the voltage transition generated by the turn-on of the one controlled switch. The switch-controlling pulses are applied so that the series connected switches are enabled sequentially.

In one illustrative embodiment of my invention a pair of series connected silicon-controlled rectifiers is connected across a voltage source. The common point between the rectifiers is connected to a load circuit containing a plurality of ferreeds via a switching network including a plurality of selecting relays and charging capacitors. The control gate of each rectifier is coupled to a pulse source via a network that includes an RC integrating circuit and a diode. The network is effective to allow short duration negative pulses to be applied immediately to the connected control gate and to allow shorter duration positive pulses to be applied only after a delay period determined by the parameters of the RC integrating circuit. The pulse source is transformer coupled to each network so that a relatively narrow positive pulse is applied to one network and a somewhat wider negative pulse is applied to the other network at each pulse transition. The positive pulse is terminated prior to the completion of the negative pulse. In this way, according to my invention, the negative pulse reverse biases and disables one rectifier when the positive pulse is effective to turn on the other rectifier. The rapid voltage transition generated by the turn-on of the other rectifier is thereby prevented from turning on the one rectifier although both rectifiers are of the high-speed type.

DETAILED DESCRIPTION

Figure 1:
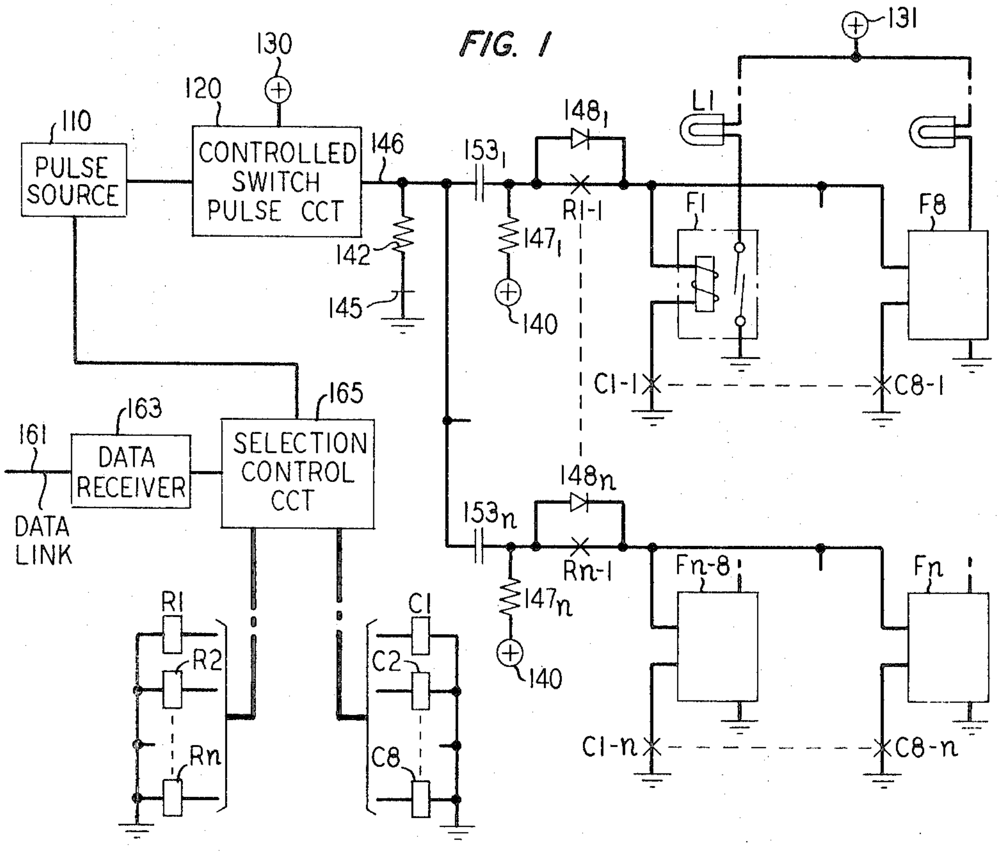
FIG. 1 shows a diagram illustrating a system in which my invention may be used.

My invention is described in the context of the switching arrangement shown in FIG. 1. The switching scheme shown therein is used to control a plurality of indicating lamps in response to information received from a data link line. It is to be understood, however, that the invention may be used in many other types of switching schemes. Referring to FIG. 1 an array of ferreeds F1 through F*n* is shown. These ferreeds are placed in horizontal groups of eight. Other arrangements are of course possible. For purposes of illustration only, two groups are shown in FIG. 1. One group consists of ferreeds F1 through F8 and the other group consists of ferreeds F*n*–8 through F*n*.

As previously described each ferreed such as F1 contains a closed magnetic path, one section of which may be a permanent magnet and another section of which is composed of a remanent square loop material. This magnetic path is shunted by a pair of magnetizable contacts so that when the aforementioned path sections are magnetized in opposite directions no net magnetomotive force exists across the contacts and no flux flows through the contacts. In this event, the spring force repelling the contacts operates to keep them open. When the two sections are polarized in the same direction, there is a net MMF across the contacts so that flux flows through the contact pair and they close.

The remanent square loop material section has a solenoid wound around it so that short duration current pulses may be applied thereto. One polarity current pulse switches the material to a state which causes the contacts to close and the opposite polarity current pulse switches the material to a state which causes the contacts to open. Since the remanent material maintains its state after the current pulse has terminated, the contacts remain in the same condition until an opposite polarity current pulse applies. As shown in FIG. 1, the contacts of ferreed F1 are connected in series with a lamp L1 and a voltage source 131. This insures that the lamp will be lit only when the contacts of ferreed F1 are closed in response to a previously applied current pulse of the appropriate polarity.

Each ferreed solenoid is returned to ground via a relay contact. The relay contacts connected to the ferreed solenoids in the column containing ferreeds F1 and F*n*–8 are controlled by relay coil C1. In like manner, the contacts C8–1 through C8–1 n are controlled by relay winding C8 and the other relay contacts not shown are controlled respectively by relay coils C2 through C7. Each group of eight ferreeds is connected to controlled switch pulse circuit 120 via a relay contact shunted by a diode. The group including ferreeds F1 through F8 is connected via relay contact R1–1 which is shunted by diode $148_1$. Group F*n*–8 through F*n* is connected via relay contact R*n*–1 which is shunted by diode $148_n$. These relay contacts are controlled by relay coils R1 through R*n*. For example, coil R1 controls contact R1–1 and coil R*n* controls contact R*n*–1.

Information received via data link line 161 is applied to selection control circuit 165 through data receiver 163. Selection control circuit 165 operates to close one relay coil of relays C1 through C8 and one or more relay coils of relays R1 through R*n*. The closing of relay C1 provides a path via diodes $148_1$ through 148n for positive pulses from circuit 120 to all of the ferreeds in the column containing ferreeds F1 through F*n*–8. Positive pulses may be applied through diode $148_1$ to release all of these ferreeds. If relay coil R1 is operated concurrently with relay coil C1 only contact R1–1 is closed and a negative current pulse may be applied to ferreed F1. This negative pulse operates to close contacts of ferreed F1 so that lamp L1 is lit. In accordance with the aforementioned description, the contacts of ferreed F1 remain closed until another positive pulse is applied to the ferreed solenoid to release them.

In response to information from data link line 161, selection control circuit 165 applies a signal to pulse source 110. This pulse source in turn transmits an input pulse to circuit 120. The leading transition of this input pulse causes circuit 120 to generate a positive pulse which is applied via capacitors $153_1$ through $153_n$ and diodes $148_1$ through $148_n$ to the ferreeds of the column previously selected by the closing of one of relays C1 through C8. If relay coil C1 is operated, contacts C1–1 through C1–*n* are closed so that all ferreeds in the first column are released. This positive pulse charges each of capacitors $153_1$ through $153_n$. At the trailing edge of the pulse from source 110, circuit 120 generates a negative pulse which operates to connect the common lead of capacitors $153_1$ through $153_n$ to a ground reference potential so that these capacitors are discharged through circuit 120.

During the discharge, negative current pulses are applied to each group of ferreeds in which the corresponding relay contact of R*n* through R*n*–1 is closed. Thus, if relays C1 and R1 are operated, the contacts of ferreed F1 are closed. It is to be understood that more than one of relays R1 through R*n* may be closed concurrently so that a plurality of ferreeds are operated in response to the application of one negative current pulse. After the termination of the negative current pulse, the operated ferreeds, such as F1, remain closed and the corresponding lamps are lit until a further positive current pulse is applied.

Control switch pulse circuit 120 generates a pair of successive high current pulses of opposite polarity to first release all ferreeds selected by the operated C relay and then selectively operate ferreeds concurrently connected through one or more R relays and a C relay. Since some groups of ferreeds are not operated by the negative current pulse because the associated R relays are not closed, charge may remain on the capacitors connected to these groups. This charge is removed via the paths which include voltage source 140, resistors $147_1$ through $147_n$, resistor 142, and normally closed relay contact 145. Relay contact 145 is open only during the pulsing operation while circuit 120 is operating. Its closure completes a discharge path for capacitors $153_1$ through $153_n$ after the appropriate changes in the ferreed array have been made.

Figure 2:
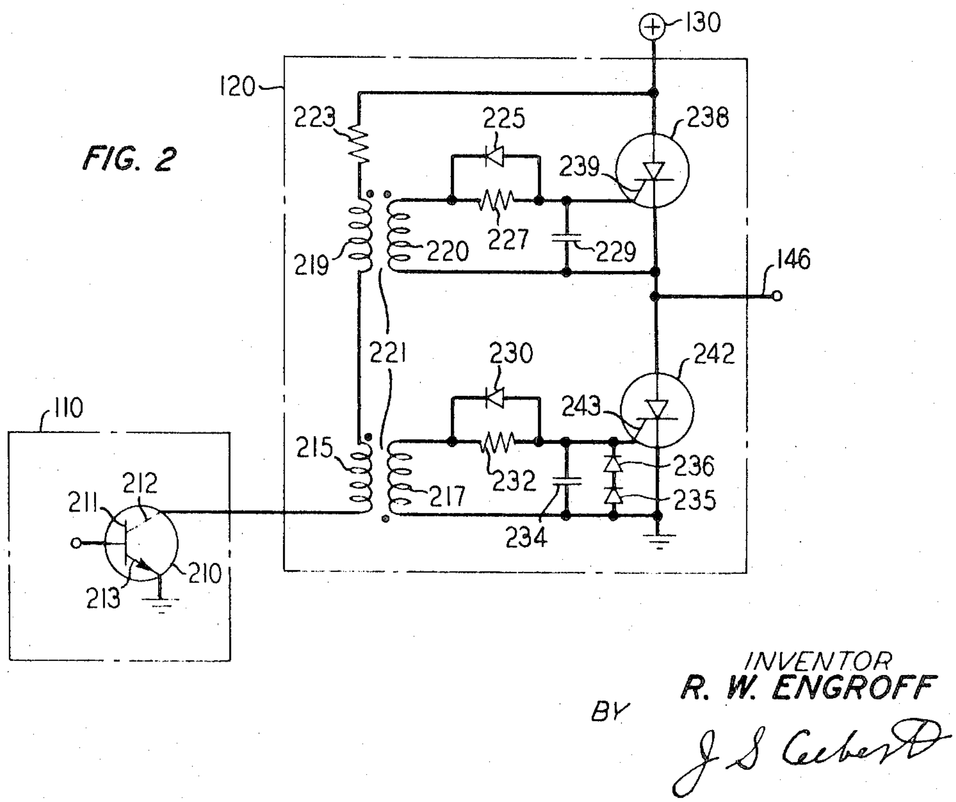
FIG. 2 depicts an illustrative embodiment of my invention.

FIG. 2 shows pulse circuit 120 which is an illustrative embodiment of my invention. One use of circuit 120 has been described with respect to FIG. 1. In FIG. 2, silicon-controlled rectifiers 238 and 242 are connected in series in like polarity between positive voltage source 130 and a ground reference potential. Pulses generated by the switching of one of rectifiers 238 and 242 to a high conductance state may then be applied via lead 146 to a utilization circuit such as the one illustrated in FIG. 1.

Each rectifier includes a control gate which operates to control the start of conduction of the anode-cathode path of the rectifier. A positive pulse applied to the control gate of a rectifier, as is well known in the art, causes the rectifier to conduct heavily so that current may then pass therethrough to a utilization device. The control gate however is not effective to turn off the rectifier and other means connected to either the anode or cathode of the rectifier must be used. In the arrangement illustrated in FIG. 1, the resonant circuit comprising a capacitor such as $153_1$ and the total inductance of the solenoids connected to capacitor $153_1$, such as the solenoid of ferreed F1, causes a resonant voltage to be applied to the cathode of rectifier 238 or the anode of rectifier 242, which voltage operates to turn off the conducting rectifier.

Figure 3:
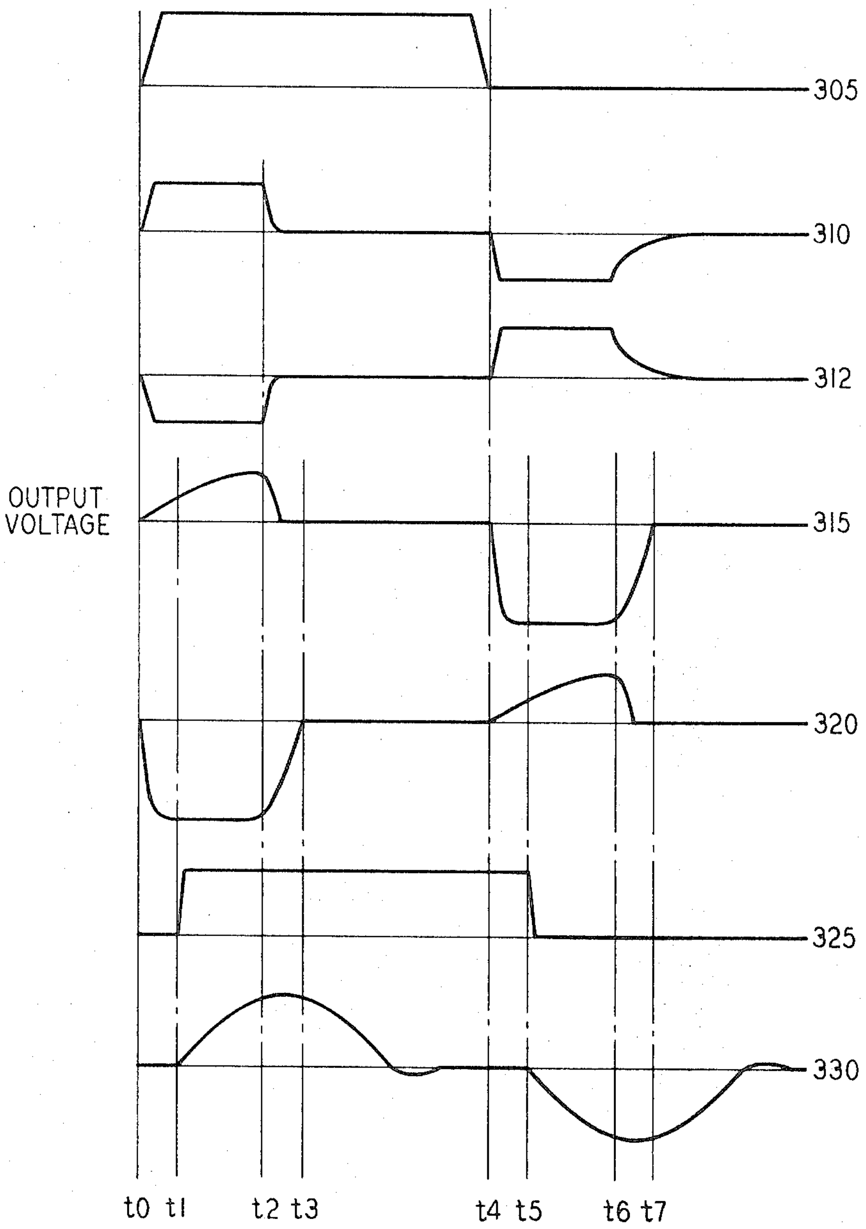
FIG. 3 shows waveforms which illustrate the operation of the illustrative embodiment of FIG. 2.

The aforementioned pair of successive positive and negative pulses is generated in response to a signal which may be a relatively wide pulse from pulse source 110 of FIG. 1. This is done in the following manner. A positive pulse from source 110, shown in waveform 305 of FIG. 3, is applied to base 211 of transistor 210. Transistor 210 is part of source 110. Transistor 210 starts to conduct shortly after time $t_0$ and causes current to flow through windings 219 and 215 of transformer 221. The value of current is controlled by series connected resistor 223, one terminal of which is connected to voltage source 130. Transformer 221 is arranged so that a relatively narrow positive pulse appears across winding 220 and a relatively narrow negative pulse appears across winding 217 in response to the positive going transition of the pulse applied to base 211. The positive signal across winding 220 is shown in waveform 310 and the negative signal across winding 217 is shown in waveform 312 between $t_0$ and $t_2$.

The negative pulse across winding 217 is conducted through diode 230 which is now forward biased. This pulse is then immediately applied to control gate 243 of rectifier 242. Because of the unidirectional low impedance of diode 230, resistor 232 and capacitor 234 are not effective to delay the pulse applied to control gate 243. The negative pulse at control gate 243 reverse biases the control gate and, as is well known in the art, operates as a switch-disabling signal to prevent the turn-on of rectifier 242, even though transient voltage may be applied to the anode thereof. Diodes 235 and 236 are effective to limit the negative voltage excursion at control gate 243.

The positive voltage across winding 220 is transmitted to control gate 239 through resistor 227. This is so because the positive pulse reverse biases diode 225 connected across resistor 227. The network consisting of series connected resistor 227 and shunt connected capacitor 229 is an integrating network, well known in the art, which delays the application of the positive pulse from winding 220 to control gate 239. The delay circuit arrangement insures that the positive pulse is applied to control gate 239 only after the reverse biasing pulse has been applied from winding 217 to control gate 243. As shown in FIG. 3, the negative pulse at control gate 243 (waveform 320) between times $t_0$ and $t_3$, encompasses the full duration of the positive pulse at control gate 239 (waveform 315) between times $t_1$ and $t_2$. Thus, when rectifier 238 is enabled by the positive pulse of waveform 315 between $t_1$ and $t_2$, rectifier 242 is always reverse biased. This insures that the positive going voltage transient (waveform 325) generated at time $t_1$ by the rapid conduction of rectifier 238 is prevented from turning on rectifier 242.

At $t_4$, the negative transition of waveform 305 is applied to base 211 and a relatively narrow negative pulse appears across winding 220 as shown on waveform 310 between $t_4$ and $t_6$. A relatively narrow positive pulse appears across winding 217 at this time as shown on waveform 312 between $t_4$ and $t_8$. The negative pulse across winding 220 is conducted through diode 225 to control gate 239 without delay because diode 225 is now a low impedance shunted across resistor 227. The reverse bias effect of this negative pulse, shown on waveform 315, disables rectifier 238 between times $t_4$ and $t_7$.

The positive pulse across winding 217 is applied to control gate 243 via the integrating network consisting of resistor 232 and capacitor 234. This is so because the positive pulse operates to reverse diode 230 so that it is now a high impedance. The positive pulse occurring between $t_5$ and $t_6$ on waveform 320 enables rectifier 242 so that it is rendered conductive. Since rectifier 238 is reverse biased during the time rectifier 242 is switched to its high conductance state, rectifier 238 is prevented from turning on at time $t_5$ in response to the negative going voltage transient across rectifier 242 (waveform 325). In this way, according to my invention, the conduction of only one rectifier at a time is assured. Thus, a positive current pulse due to the conduction of rectifier 238 is first applied to the utilization circuit connected to lead 246. The positive pulse is followed by a negative current pulse generated by the conduction of rectifier 242. The current pulses are shown in waveform 330.

When rectifier 238 is rendered conductive, current flows from voltage source 130 therethrough to lead 146. The pulse applied to lead 146 is shown on waveform 330 between times $t_1$ and $t_3$. The positive voltage transition which appears at the anode of rectifier 242 at $t_1$ is sufficient to turn on rectifier 242, but the reverse biasing of control gate 243 disables rectifier 242. The positive voltage on lead 146 passes through one or more of previously uncharged capacitors $153_1$ through $153_n$ and one or more of diodes $148_1$ through $148_n$ and causes the previously operated ferreeds of the array shown in FIG. 1 to be released. The series connected capacitor and ferreed solenoids form a resonant circuit so that after the first half cycle of the oscillatory waveform at lead 146, determined by the resonant circuit, the current at the cathode of rectifier 238 is reduced sufficiently to cause that rectifier to turn off.

Subsequently, at $t_5$, rectifier 242 is enabled by the positive pulse shown on waveform 320. Rectifier 242 is then a very low impedance between lead 146 and the ground reference potential. This sudden change of impedance is effective to discharge certain previously charged capacitors $153_1$ through $153_n$ so that current passes through selected ferreeds of FIG. 1 to cause them to operate. Since the current is oscillatory in nature, the current in lead 146 due to the previously mentioned resonant circuit turns off rectifier 242 at the end of the first half cycle. When rectifier 242 is enabled, the rapid negative voltage transition appearing at the cathode of rectifier 238 is sufficient to turn on that rectifier. The negative pulse at control gate 239, shown on waveform 315 between times $t_4$ and $t_7$, is sufficient to prevent the turn-on of rectifier 238. Thus, in accordance with my invention, the pulse coupling circuits between transistor 210 and control gates 239 and 243 are operative to insure the turn-on of only one rectifier at a time, even though the voltage transition caused by the turn-on is sufficient to enable the other rectifier.

Although my invention has been described with reference to a particular embodiment, it is to be understood that the arrangements disclosed are merely illustrative of the principles of the invention. For example, the integrating circuits in the aforementioned embodiment may be replaced by delay lines or other forms of delay circuits known in the art and the pulse transformer of FIG. 2 may be replaced by other suitable coupling arrangements such as transistors. It is also to be understood that the reference potential to which rectifier 242 is returned may be a negative voltage source so that positive and negative pulses may be obtained without the need for alternately charging and discharging capacitors such as $153_1$ through $153_n$. It is to be further understood that more than two controlled switches may be serially connected in like polarity across a voltage source and that one or more of these switches may be enabled while the other switches are disabled. Such an arrangement advantageously withstands higher voltage at the output terminal without breakdown of the disabled switches. Numerous other modifications and other arrangements may be devised by those skilled in the art without departing from the spirit and scope of the invention.

I claim:

1. A pulse circuit comprising a voltage source, a pair of controlled switches each having a control electrode, said switches being serially connected in like polarity across said voltage source, a signal source, and means connected between said signal source and said control electrodes responsive to the initial portion of a signal from said source for concurrently applying a switch-disabling pulse to one control electrode and a switch-enabling pulse to the other control electrode, and means responsive to the terminating portion of said signal for concurrently applying a switch disabling pulse to said other control electrode and for applying a switch enabling pulse to said one control electrode.

2. A pulse circuit according to claim 1 wherein each of said means for concurrently applying said switch-disabling pulse and said switch-enabling pulse comprises means for immediately applying said switch-disabling pulse to one of said control electrodes and means for applying said switch-enabling pulse comprises pulse-delaying means connected between said signal source and the other of said control electrodes.

3. A pulse circuit according to claim 1 wherein said means for immediately applying said switch-disabling pulse comprises first means for transmitting a pulse of one polarity to said corresponding control electrode and said pulse delaying means comprises second means for applying a pulse of the opposite polarity to said corresponding control electrode.

4. A pulse circuit according to claim 3 wherein said means for transmitting a pulse of one polarity comprises unidirectional conducting means connected between said signal source and said control electrode and said pulse delaying means comprises a delay network connected between said signal source and said control electrode.

5. A pulse circuit according to claim 4 wherein said delay network comprises a resistor-capacitor integrating network.

6. A circuit for generating a pair of sequential, opposite polarity pulses comprising a voltage source; first and second controlled switches each having a control gate, an anode, and a cathode; said first switch anode being connected to said voltage source; said first switch cathode being connected to said second switch anode; said second switch cathode being connected to a reference potential; a source of pulses; means responsive to each positive pulse transition for immediately applying a negative signal to said first switch control gate; means responsive to each positive pulse transition for applying a delayed positive signal to said second switch control gate; means responsive to each negative pulse transition for applying a delayed positive signal to said first switch control gate; and means responsive to each negative pulse transition for immediately applying a negative signal to said second switch control gate whereby said first and second controlled switches are alternately enabled.

7. A pulse circuit according to claim 6 further comprising capacitor means connected to the junction of said first switch cathode and said second switch anode, said capacitor means being charged in response to the turn-on of said first switch and being discharged in response to the turn-on of said second switch.

8. A pulse circuit according to claim 6 further comprising means including resonant circuit means connected to the junction of said first switch cathode and said second switch anode for turning off each of said alternately enabled switches after a time period determined by said resonant circuit means.

9. A circuit according to claim 6 wherein transformer means are connected to said pulse source, each of said positive signal-applying means comprises a delay network connected between said transformer means and the associated switch control gate, and each of said negative signal-applying means comprises diode means connected between said transformer means and the associated switch control gate.

10. A circuit according to claim 9 wherein each of said delay networks comprises a resistor connected between said transformer means and the associated switch control gate and a capacitor connected between the control gate and the cathode of the associated switch.

11. A circuit according to claim 10 wherein each of said delayed positive signal-applying means is operative in response to each pulse transition to terminate said delayed positive signal prior to the termination of the concurrently applied negative signal.

12. A pulse circuit for generating successive high current pulses of opposite polarity in response to a control signal comprising a voltage source, a pair of control switches serially connected in like polarity across said voltage source, each said switch having a control gate, a signal source, means connected between said signal source and each of said control gates and responsive to the leading edge of a control signal from said source for immediately applying a switch-disabling pulse to the control gate of one of said switches and for concurrently applying a delayed enabling pulse to the control gate of the other of said switches, and means responsive to the trailing edge of said control signal from said source for immediately applying a switch-disabling pulse to said control gate of said other of said switches and for concurrently applying a delayed enabling pulse to said control gate of said one of said switches.